(12) United States Patent
Shih

(10) Patent No.: US 12,454,816 B2
(45) Date of Patent: Oct. 28, 2025

(54) DRAIN VALVE ASSEMBLY

(71) Applicant: Tai-World Mfg. Co., Ltd., Changhua (TW)

(72) Inventor: Sen-Tien Shih, Changhua (TW)

(73) Assignee: Tai-World Mfg. Co., Ltd., Changhua (TW)

( * ) Notice: Subject to any disclaimer, the term of this patent is extended or adjusted under 35 U.S.C. 154(b) by 0 days.

(21) Appl. No.: 18/595,551

(22) Filed: Mar. 5, 2024

(65) Prior Publication Data

US 2025/0283315 A1  Sep. 11, 2025

(51) Int. Cl.
| | |
|---|---|
| *E03C 1/23* | (2006.01) |
| *E03C 1/182* | (2006.01) |
| *E03C 1/26* | (2006.01) |
| *F16K 11/087* | (2006.01) |
| *F16K 27/06* | (2006.01) |

(52) U.S. Cl.
CPC ............ *E03C 1/2302* (2013.01); *E03C 1/182* (2013.01); *E03C 1/26* (2013.01); *F16K 11/0873* (2013.01); *F16K 27/067* (2013.01); *E03C 2001/2315* (2013.01)

(58) Field of Classification Search
CPC ...... E03C 1/23; E03C 1/2302; E03C 2001/2315; E03C 1/22; E03C 1/262; E03C 1/26; E03C 1/182; F16K 11/0873; F16K 11/087; F16K 27/067; F16K 5/0605
USPC ............................................. 4/688
See application file for complete search history.

(56) References Cited

U.S. PATENT DOCUMENTS

| | | | | | |
|---|---|---|---|---|---|
| 1,287,247 | A | * | 12/1918 | Cross ..................... | E03C 1/2302 4/668 |
| 1,964,423 | A | * | 6/1934 | Blickman ................. | E03C 1/23 4/287 |
| 1,974,419 | A | * | 9/1934 | Cornell, Jr. ........... | E03C 1/2304 4/688 |
| 2,580,575 | A | * | 1/1952 | Muckler ................... | E03C 1/23 4/683 |
| 2,597,399 | A | * | 5/1952 | Steele ................... | E03C 1/2302 251/181 |
| 2,697,840 | A | * | 12/1954 | Steele .................... | E03C 1/2302 4/690 |
| 2,699,555 | A | * | 1/1955 | Green ..................... | F16K 5/061 137/550 |
| 3,499,628 | A | * | 3/1970 | Milton .................. | F16K 27/067 251/309 |

(Continued)

*Primary Examiner* — David Colon-Morales
(74) *Attorney, Agent, or Firm* — Demian K. Jackson; Jackson IPG PLLC

(57) ABSTRACT

A drain valve assembly contains a body including a chamber, at least one rotatable stop portion, a first receiving orifice, a discharge orifice, a coupling orifice, and a second receiving orifice. A shaftless ball valve is received in the chamber and includes a fixing orifice, an opening, a first draining orifice, a second draining orifice, a third draining orifice and a stopping face. A first reinforcement ring is mounted on the upper support portion and the lower support portion. A second reinforcement ring is located at an upper portion of the chamber. A positioning ring includes a through orifice and an abutting portion. A controller includes a connection portion and an operation portion. A limiter is configured to connect the controller with the coupling orifice, and a filtration holder disposed on the first receiving orifice.

8 Claims, 15 Drawing Sheets

(56) References Cited

U.S. PATENT DOCUMENTS

| | | | | |
|---|---|---|---|---|
| 5,210,886 | A * | 5/1993 | Coe, III | E03B 1/044 |
| | | | | 4/665 |
| 5,313,677 | A * | 5/1994 | Coe | F16K 31/46 |
| | | | | 4/683 |
| 6,058,526 | A * | 5/2000 | Parisi | E03C 1/23 |
| | | | | 4/287 |
| 6,145,136 | A * | 11/2000 | Parisi | E03C 1/2302 |
| | | | | 4/291 |
| 6,584,625 | B2 * | 7/2003 | Weaver | E03F 5/16 |
| | | | | 251/127 |
| 6,609,259 | B2 * | 8/2003 | Cantrell | E03C 1/23 |
| | | | | 4/640 |
| 9,009,885 | B2 * | 4/2015 | Faasse | E03C 1/232 |
| | | | | 4/441 |
| 9,194,111 | B2 * | 11/2015 | Bohacik | F16K 5/0652 |
| 9,243,393 | B1 * | 1/2016 | Tidwell | E03C 1/2302 |
| 10,513,841 | B1 * | 12/2019 | Robillard | E03C 1/244 |

* cited by examiner

DRAIN VALVE ASSEMBLY

TECHNICAL FIELD

The present invention relates to a drain valve assembly which is fixed below a water sink and capable of being actuated for stopping and draining water.

BACKGROUND

A conventional drain valve assembly is disclosed in U.S. Pat. No. 6,058,526, but such a drain valve assembly is manufactured difficultly. As illustrated in FIGS. 4 and 7 of U.S. Pat. No. 6,058,526, the conventional drain valve assembly contains a hollow ball valve, and the hollow ball valve includes a socket fixed on an end thereof, a roller connected on the other end of the hollow ball valve, and a drainage hole and a flat surface which are defined on the hollow ball valve, wherein the flat surface is beveled from a quarter spherical shape. The hollow ball valve is accommodated in a body and is machined for the discharge and the beveled surface process. Also, the hollow ball valve includes the roller connected with a trunion. A retainer includes a retainer bar received in an opening thereof and configured to rotatably operate the retainer easily. However, it is easy to block impurities in the retainer to reduce water discharge from the conventional drain valve assembly. In addition, the body of the hollow ball valve is machined and connected troublesomely to increase the machining cost and connecting difficulty.

The present invention has arisen to mitigate and/or obviate the afore-described disadvantages.

SUMMARY

The primary aspect of the present invention is to provide a drain valve assembly by which the discharge orifice has the lower support portion extending to the chamber from a lower end thereof so that the first reinforcement ring and the second reinforcement ring are mounted on the shaftless ball valve in the chamber, thus machining and connecting the body easily.

Another aspect of the present invention is to provide a drain valve assembly by which the shaftless ball valve includes the defining orifice configured to match with the limiting post, thus machining the shaftless ball valve quickly to reduce a defective rate greatly.

To obtain the above-mentioned aspects, a drain valve assembly provided by the present invention contains a body including a chamber formed in the body and having at least one rotatable stop portion, a first receiving orifice defined on a top of the body and communicating with the chamber, a discharge orifice formed on a side of the body, a coupling orifice defined on the other side of the body and communicating with the chamber, and a second receiving orifice formed on a bottom of the body and communicating with the chamber.

The first receiving orifice has a first shoulder formed on an outer wall of the first receiving orifice, and a second shoulder and a first threaded section which are formed on an inner wall of the first receiving orifice.

The discharge orifice has a lower support portion extending to the chamber from a lower end thereof so that a profile of the discharge orifice is downward changed from a circle shape to a non-circle shape to connect with the chamber by using an upper end of the discharge orifice, thus supplying waters.

The second receiving orifice includes an upper support portion formed on a top thereof and located in the chamber and on the lower support portion.

A shaftless ball valve is received in the chamber and includes a fixing orifice, an opening corresponding to the fixing orifice, a first draining orifice, a second draining orifice, a third draining orifice and a stopping face which are formed in turn between the fixing orifice and the opening. The opening, the first draining orifice, the second draining orifice, and the third draining orifice are communicated with one another. The shaftless ball valve further includes a defining orifice corresponding to the rotatable stop portion, a limiting post configured to match with the defining orifice. The limiting post has a locating section formed on an end thereof and a defending section formed on the other end of the limiting post, the location section is connected with the defining orifice, and the defending section extrudes out of the shaftless ball valve.

A first reinforcement ring is mounted on the upper support portion and the lower support portion, and the first reinforcement ring is located below the shaftless ball valve.

A second reinforcement ring is located at an upper portion of the chamber and above the shaftless ball valve.

A positioning ring includes a through orifice defined on a circular center of the positioning ring, a second threaded section formed on an outer wall of the positioning ring and configured to screw with the first threaded section, and an abutting portion is fixed on a bottom of a limiter.

A controller includes a connection portion formed on an end of the controller and connected with the fixing orifice of the shaftless ball valve.

A limiter is configured to connect the controller with the coupling orifice.

A filtration holder is disposed on the first receiving orifice.

DETAILED DESCRIPTION

Figure 1:
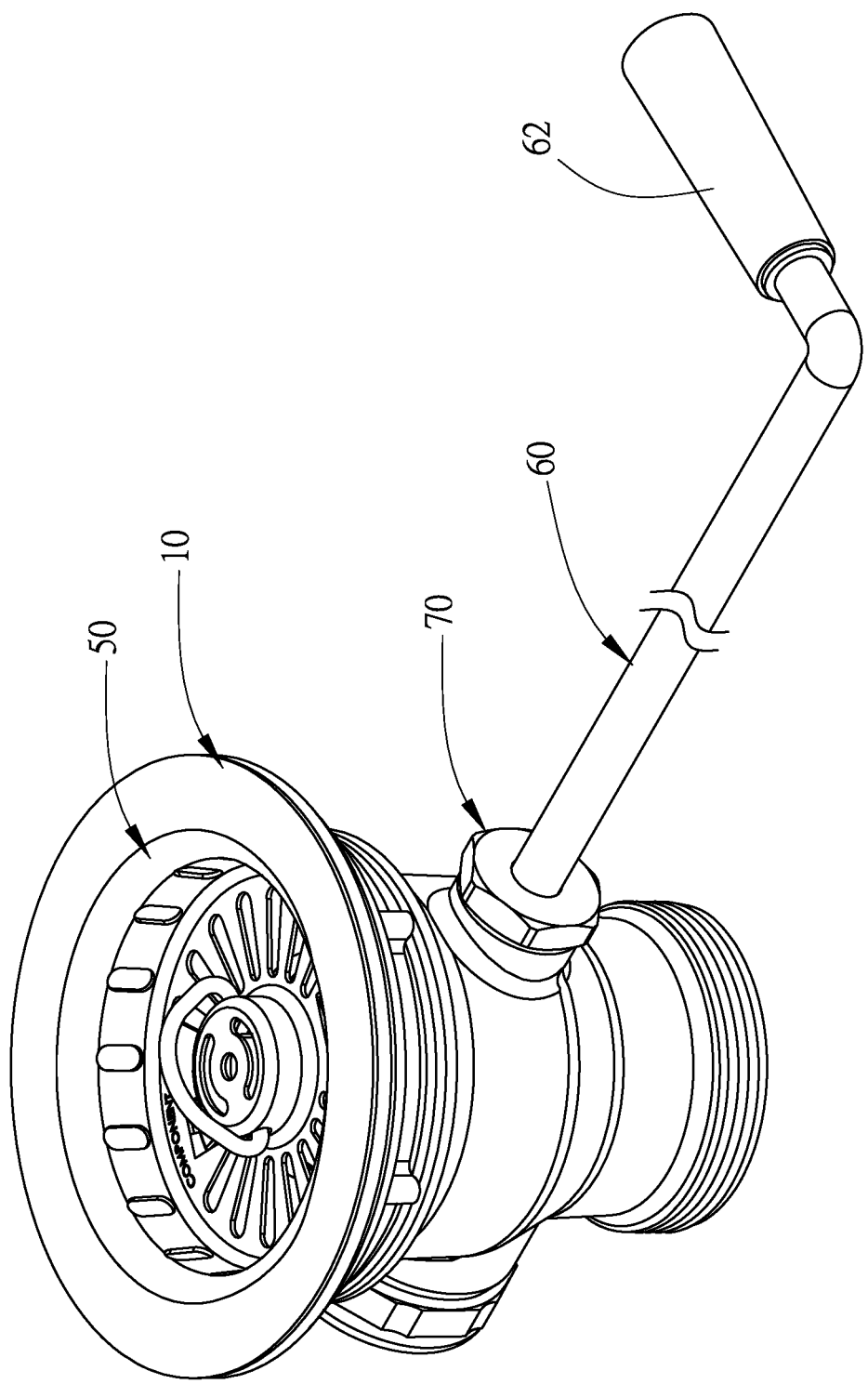
FIG. 1 is a perspective view showing the assembly of a drain valve assembly according to a preferred embodiment of the present invention.
Figure 2:
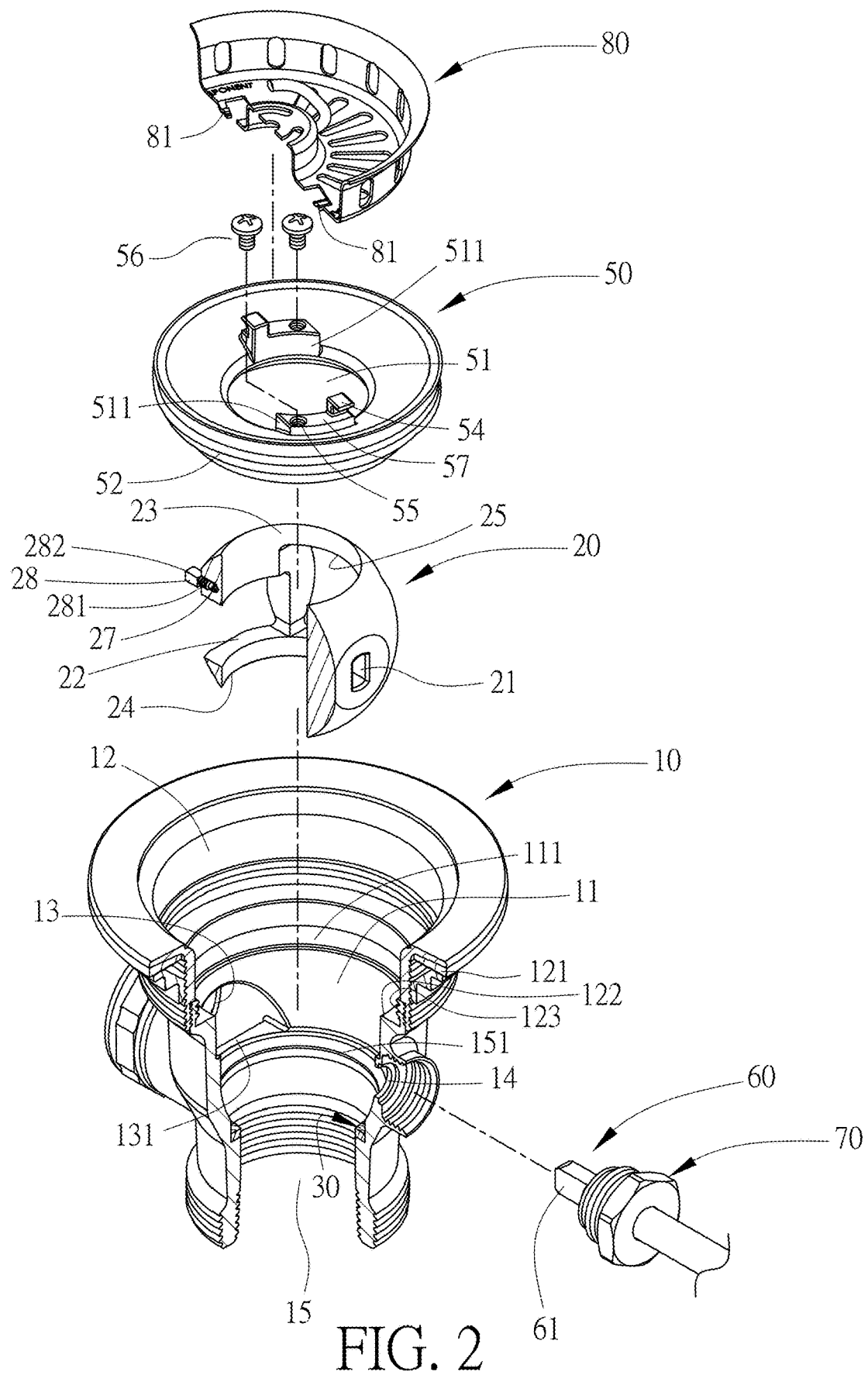
FIG. 2 is a perspective view showing the exploded components of the drain valve assembly according to the preferred embodiment of the present invention.
Figure 3:
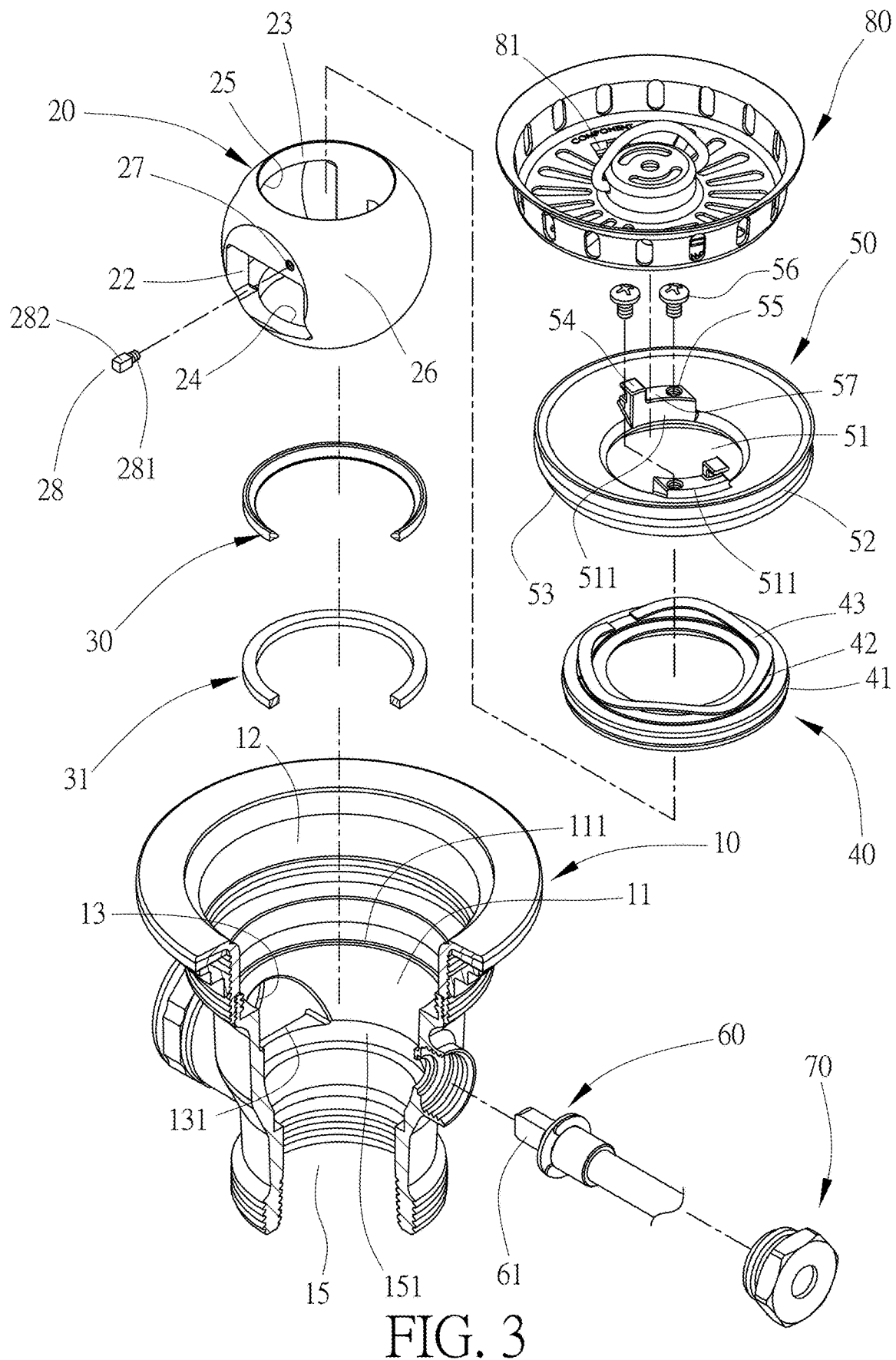
FIG. 3 is another perspective view showing the exploded components of the drain valve assembly according to the preferred embodiment of the present invention.
Figure 4:
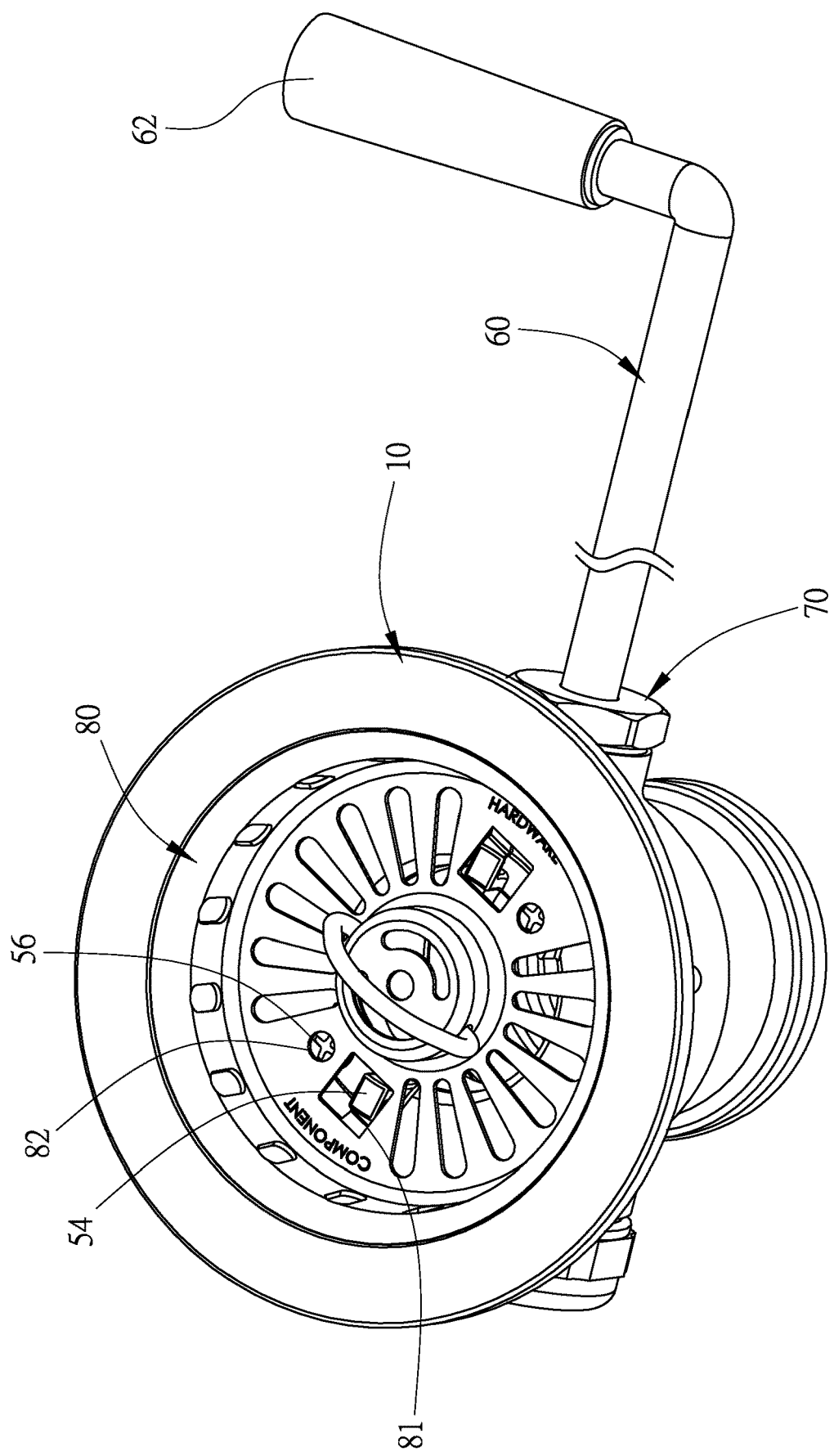
FIG. 4 is another perspective view showing the assembly of the drain valve assembly according to the preferred embodiment of the present invention.
Figure 5:
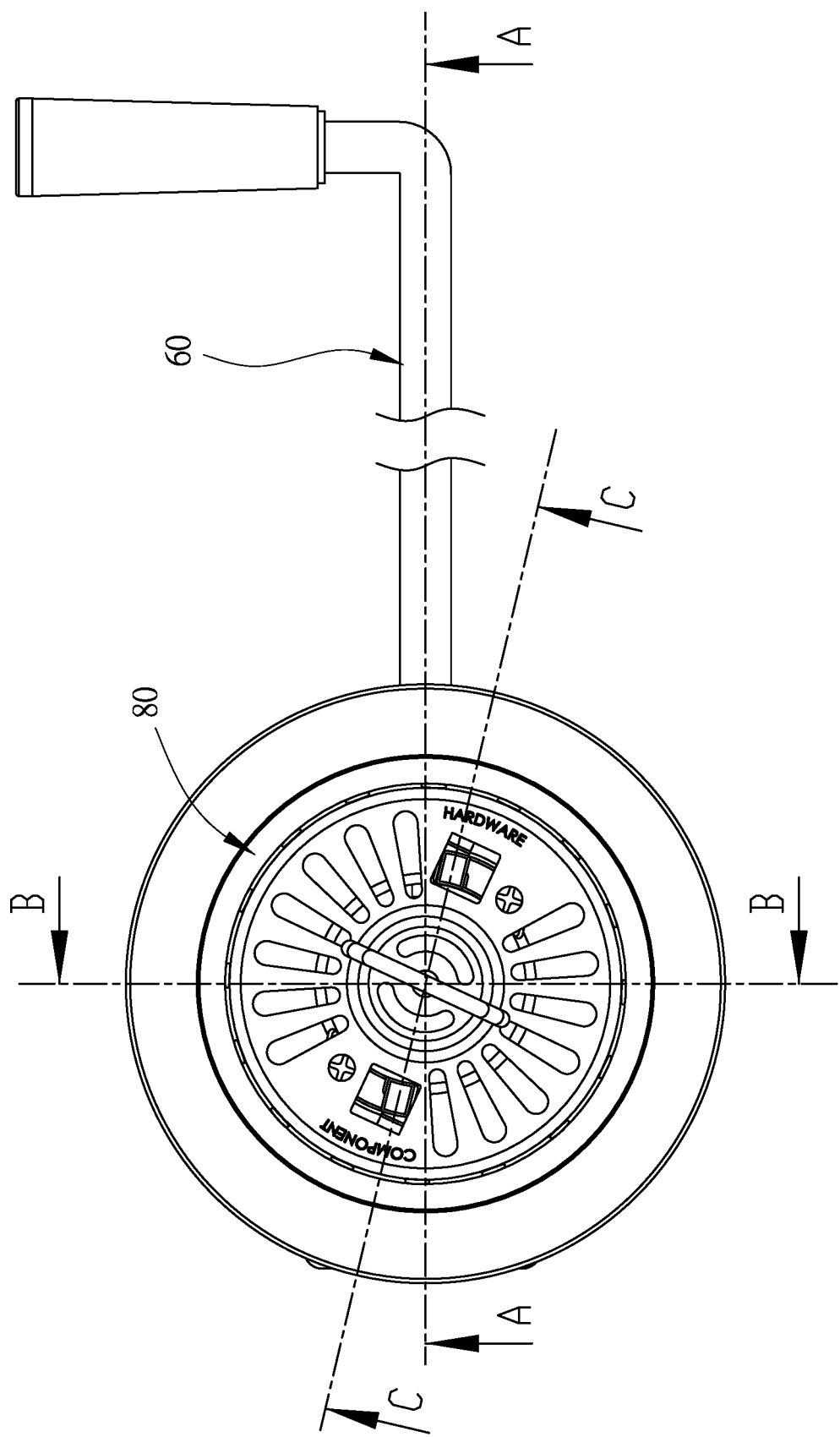
FIG. 5 is a top plan view showing the assembly of the drain valve assembly according to the preferred embodiment of the present invention.

With reference to FIGS. 1-6, a drain valve assembly according to a preferred embodiment of the present invention comprises: a body 10, a chamber 11 formed in the body 10 and having at least one rotatable stop portion 111, a first receiving orifice 12 defined on a top of the body 10 and communicating with the chamber 11, wherein a diameter of the first receiving orifice 12 is equal to or greater than a diameter of the chamber 11, a discharge orifice 13 formed on a side of the body 10, a coupling orifice 14 defined on the other side of the body 10 and communicating with the chamber 11, and a second receiving orifice 15 formed on a bottom of the body 10 and communicating with the chamber 11.

The first receiving orifice 12 has a first shoulder 121 formed on an outer wall thereof, and a second shoulder 122 and a first threaded section 123 which are formed on an inner wall of the first receiving orifice 12.

The discharge orifice 13 has a lower support portion 131 extending to the chamber 11 from a lower end thereof so that a profile of the discharge orifice 13 is downward changed from a circle shape to a non-circle shape to connect with the chamber 11 by using an upper end of the discharge orifice 13, thus supplying waters.

The second receiving orifice 15 includes an upper support portion 151 formed on a top thereof and located in the chamber 11 and on the lower support portion 131.

A shaftless ball valve 20 is received in the chamber 11 and includes a fixing orifice 21, an opening 22 corresponding to the fixing orifice 21, a first draining orifice 23, a second draining orifice 24, a third draining orifice 25 and a stopping face 26 which are formed in turn between the fixing orifice 21 and the opening 22, wherein the opening 22, the first draining orifice 23, the second draining orifice 24, and the third draining orifice 25 are communicated with one another. The shaftless ball valve 20 further includes a defining orifice 27 corresponding to the rotatable stop portion 111, a limiting post 28 configured to match with the defining orifice 27, wherein the limiting post 28 has a locating section 281 formed on an end thereof and a defending section 282 formed on the other end of the limiting post 28, wherein the location section 281 is in a threaded column shape and is screwed with the defining orifice 27, and the defending section 282 is a square column and extrudes out of the shaftless ball valve 20.

A first reinforcement ring 30 is annular and is mounted on the upper support portion 151 and the lower support portion 131, wherein the first reinforcement ring 30 includes an arcuate face defined on a top thereof and located below the shaftless ball valve 20, and the first reinforcement ring 30 includes a reinforced loop 31 connected on a bottom thereof.

A second reinforcement ring 40 is annular and includes an arcuate face defined on a bottom thereof, and the second reinforcement ring 40 includes a first seal loop 41 connected on an outer wall thereof and is located at an upper portion of the chamber 11 and above the shaftless ball valve 20, wherein the second reinforcement ring 40 includes a groove 42 defined on a top thereof and a spring 43 received in the groove 42.

A positioning ring 50 includes a through orifice 51 defined on a circular center thereof, a second threaded section 52 formed on an outer wall of the positioning ring 50 and configured to screw with the first threaded section 123, and an abutting portion 53 fixed on a bottom of a limiter 70, wherein a tilted face extends downward to a center circular center of the positioning ring 50 and between the through orifice 51 and the outer wall of the positioning ring 50, wherein the tilted face has at least one projection 511, at least one first engagement foot 54 extending from the projection 511, at least one locking orifice 55 locked with a screw 56, and at least one shrink portion 57 located between the at least one first engagement foot 54 and the locking orifice 55, wherein the at least one first engagement foot 54, the at least one locking orifice 55 and the at least one shrink portion 57 are concentric with the through orifice 51.

A controller 60 includes a connection portion 61 formed on an end thereof, an operation portion 62 formed on the other end of the controller 60, and a retainer 63 disposed adjacent to the connection portion 61, wherein the connection portion 61 is connected with the fixing orifice 21 of the shaftless ball valve 20 so that the controller 60 controls the shaftless ball valve 20 to rotate.

The limiter 70 includes a second seal loop 71, and the limiter 70 is configured to connect the retainer 63 of the controller 60 with the coupling orifice 14 and to stop the waters by using the second seal loop 71.

A filtration holder 80 is disposed on the first receiving orifice 12, wherein the filtration holder 80 includes at least one second engagement foot 81 corresponding to the at least one first engagement foot 54, and the filtration holder 80 includes at least one passing orifice 82 corresponding to the at least one locking orifice 55.

In assembly, the first reinforcement ring 30 is mounted on the upper support portion 151 and the lower support portion 131 by way of the reinforced loop 31, wherein the first reinforcement ring 30 and the reinforced loop 31 pass through a middle section of the discharge orifice 13, and the shaftless ball valve 20 is received in the chamber 11 and is engaged with the first reinforcement ring 30. The controller 60 is coupled with the fixing orifice 21 of the shaftless ball valve 20 by using the connection portion 61 and is received in the coupling orifice 14 by engaging the second seal loop 71 with the retainer 63. The second reinforcement ring 40 is located above the shaftless ball valve 20 and seals the chamber 11 by way of the first seal loop 41, and the second threaded section 52 of the positioning ring 50 is screwed with the first threaded section 123, wherein the positioning ring 50 forces the second reinforcement ring 40 to abut against the shaftless ball valve 20 so as to fix the shaftless ball valve 20. In the meantime, the defending section 282 is located on the rotatable stop portion 111. When the operation portion 62 of the controller 60 is operated, the shaftless ball valve 20 is located at a first position X1 (as shown in FIGS. 7-9) or the second position X2 (as shown in FIGS. 6, 10 and 11) to rotate, wherein the filtration holder 80 is mounted in the first receiving orifice 12, the at least one second engagement foot 81 is aligned with the shrink portion 57 to rotate the filtration holder 80, such that the at least one second engagement foot 81 is engaged with the at least one first engagement foot 54 so that the locking orifice 55 aligns with the at least one passing orifice 82, and the screw 56 of the locking orifice 55 is locked with the locking orifice 55 or the screw 56 is locked with the locking orifice 55 via the at least one passing orifice 82 (as illustrated in FIGS. 12-15).

Figure 6:
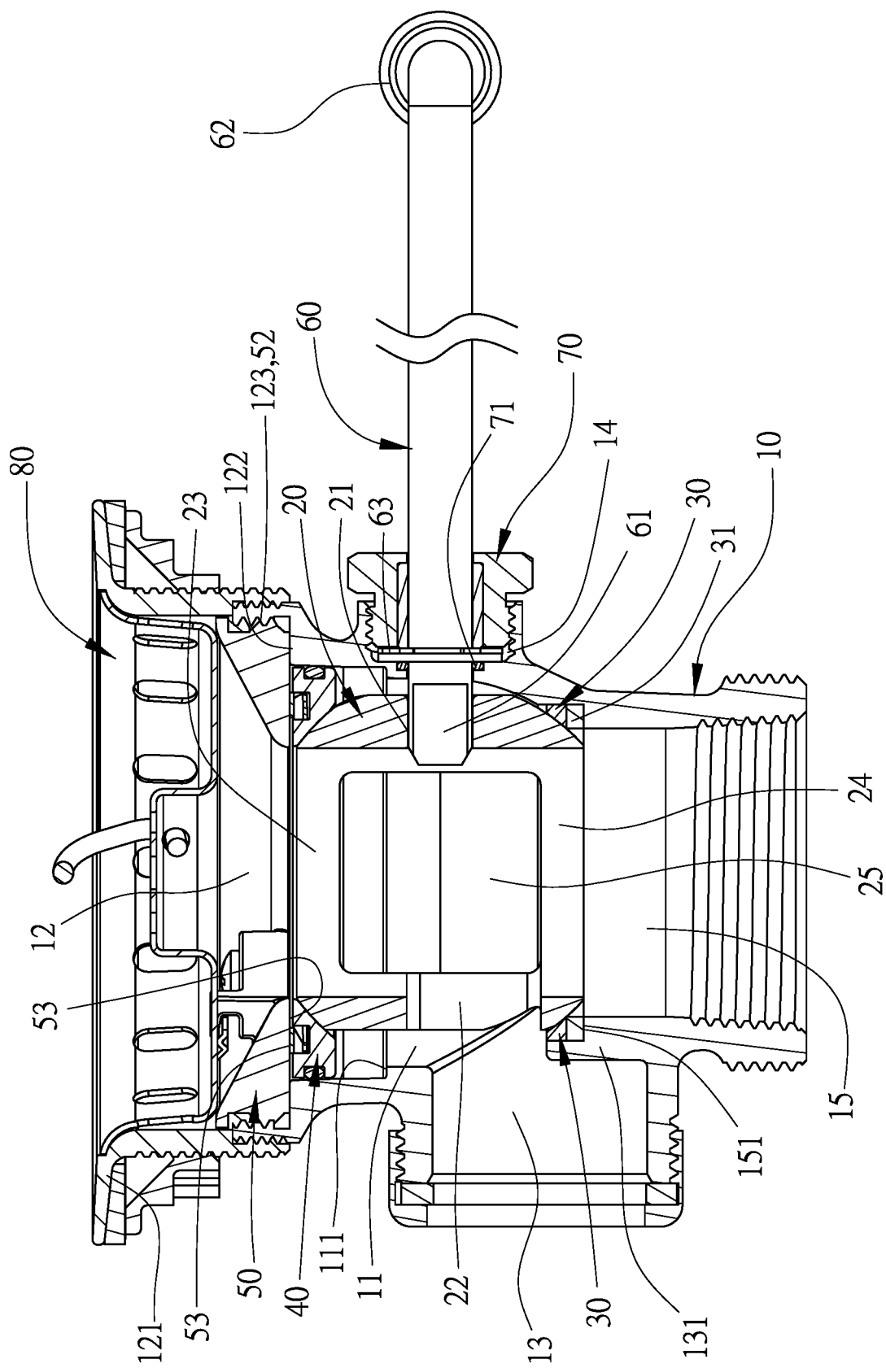
FIG. 6 is a cross sectional view taken along the line A-A of FIG. 5.
Figure 10:
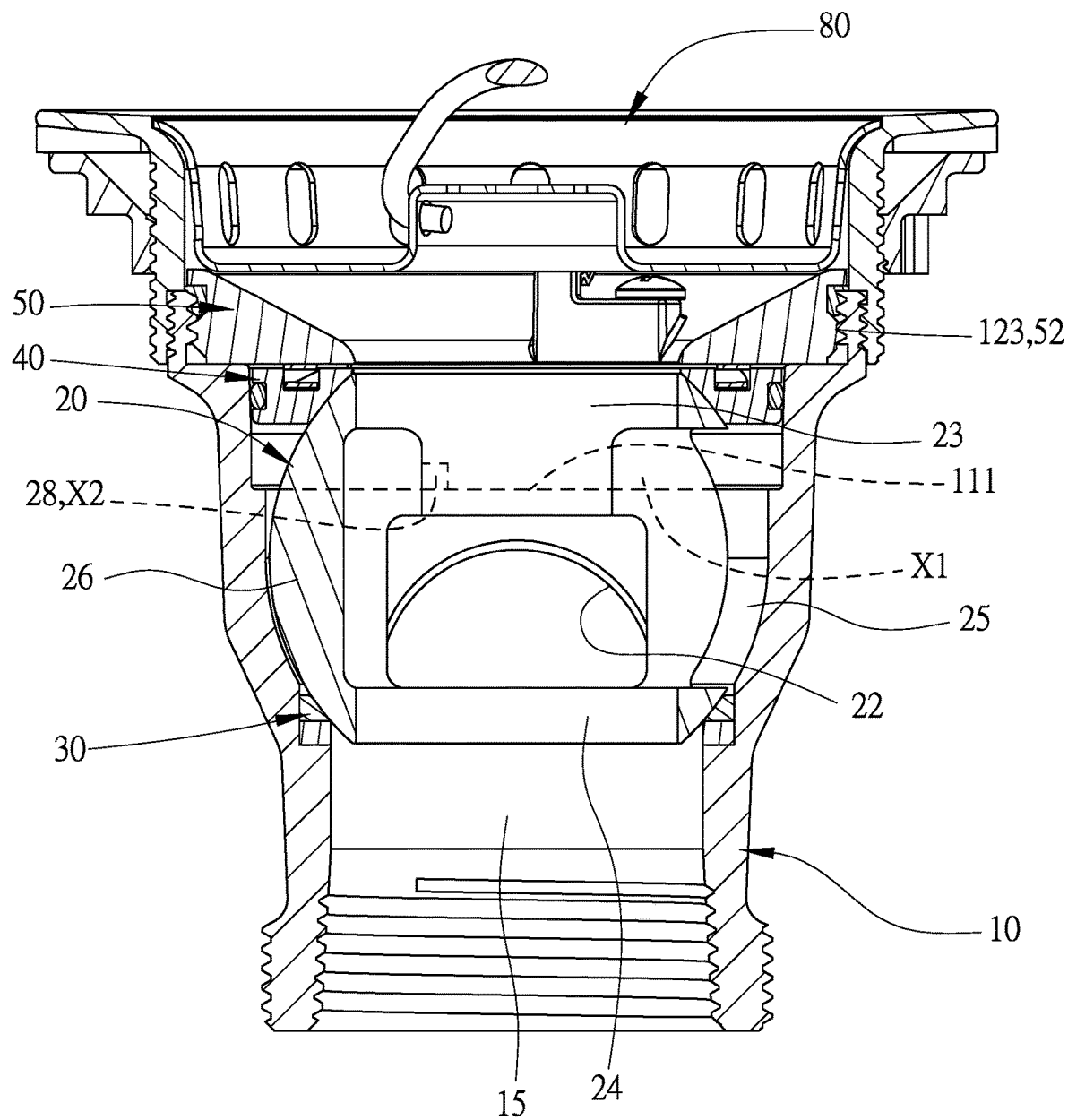
FIG. 10 is a cross sectional view taken along the line B-B of FIG. 5.
Figure 11:
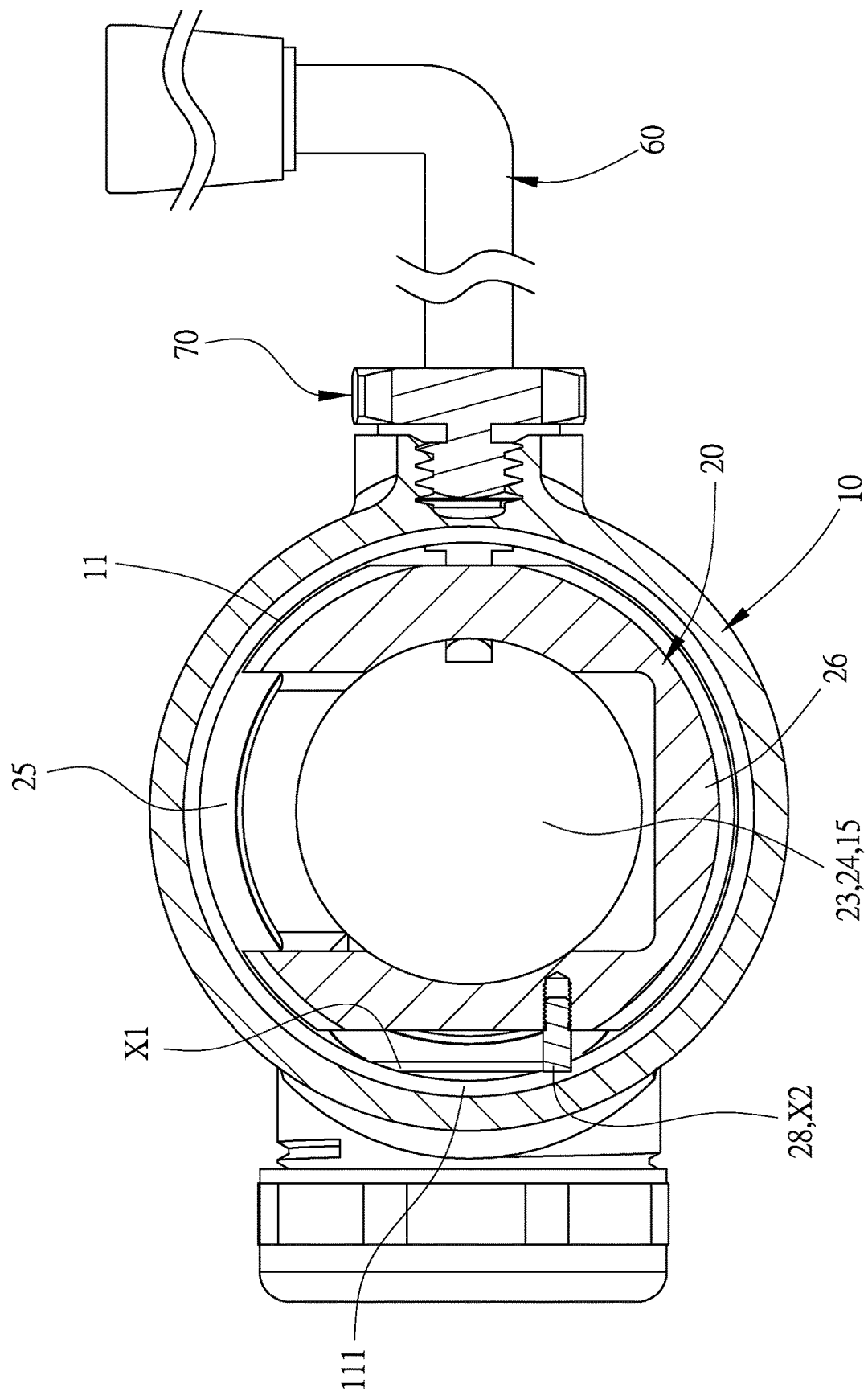
FIG. 11 is still another cross sectional view showing the operation of the drain valve assembly according to the preferred embodiment of the present invention.
Figure 12:
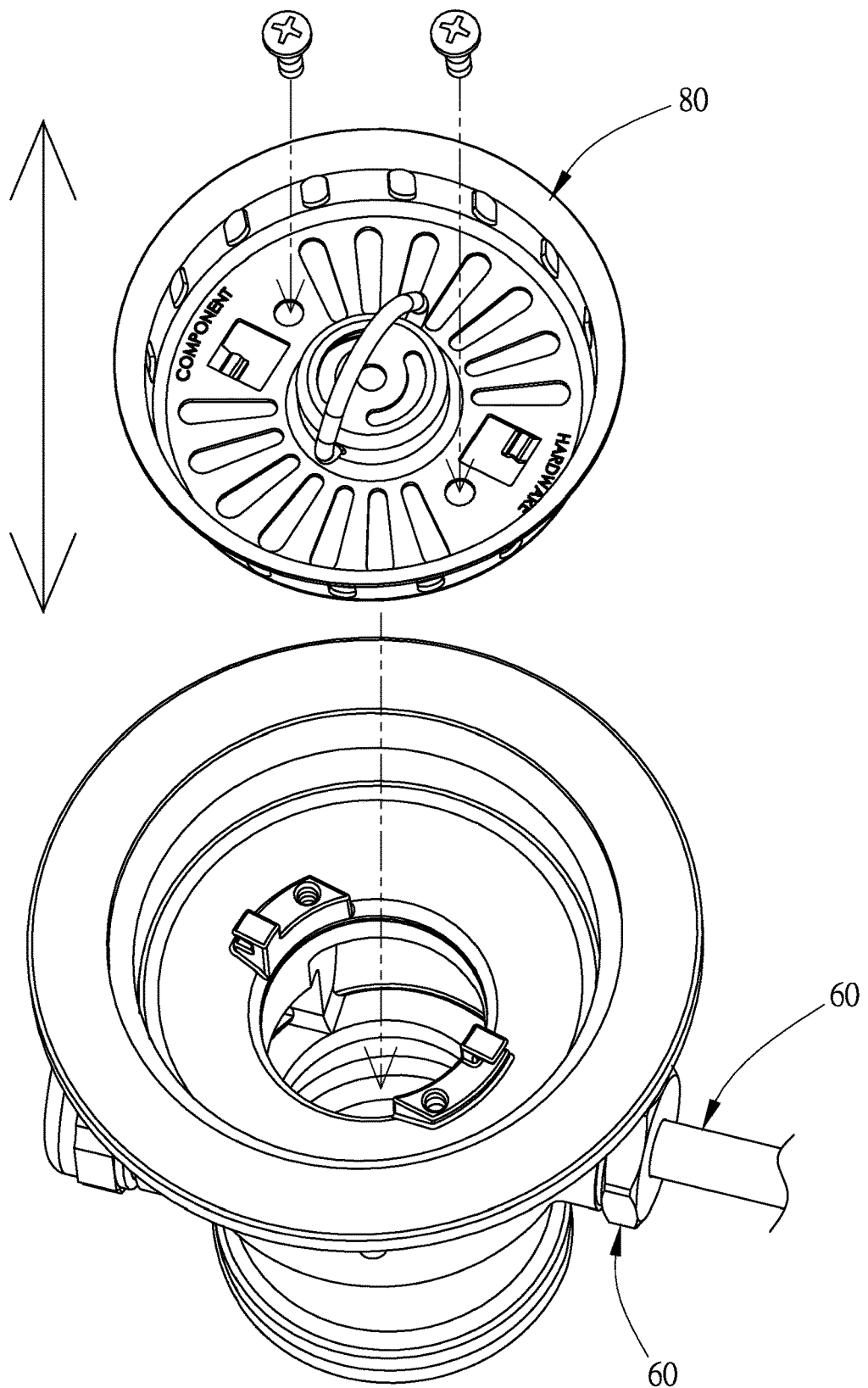
FIG. 12 is a perspective view showing the operation of a filtration holder of the drain valve assembly according to the preferred embodiment of the present invention.
Figure 13:
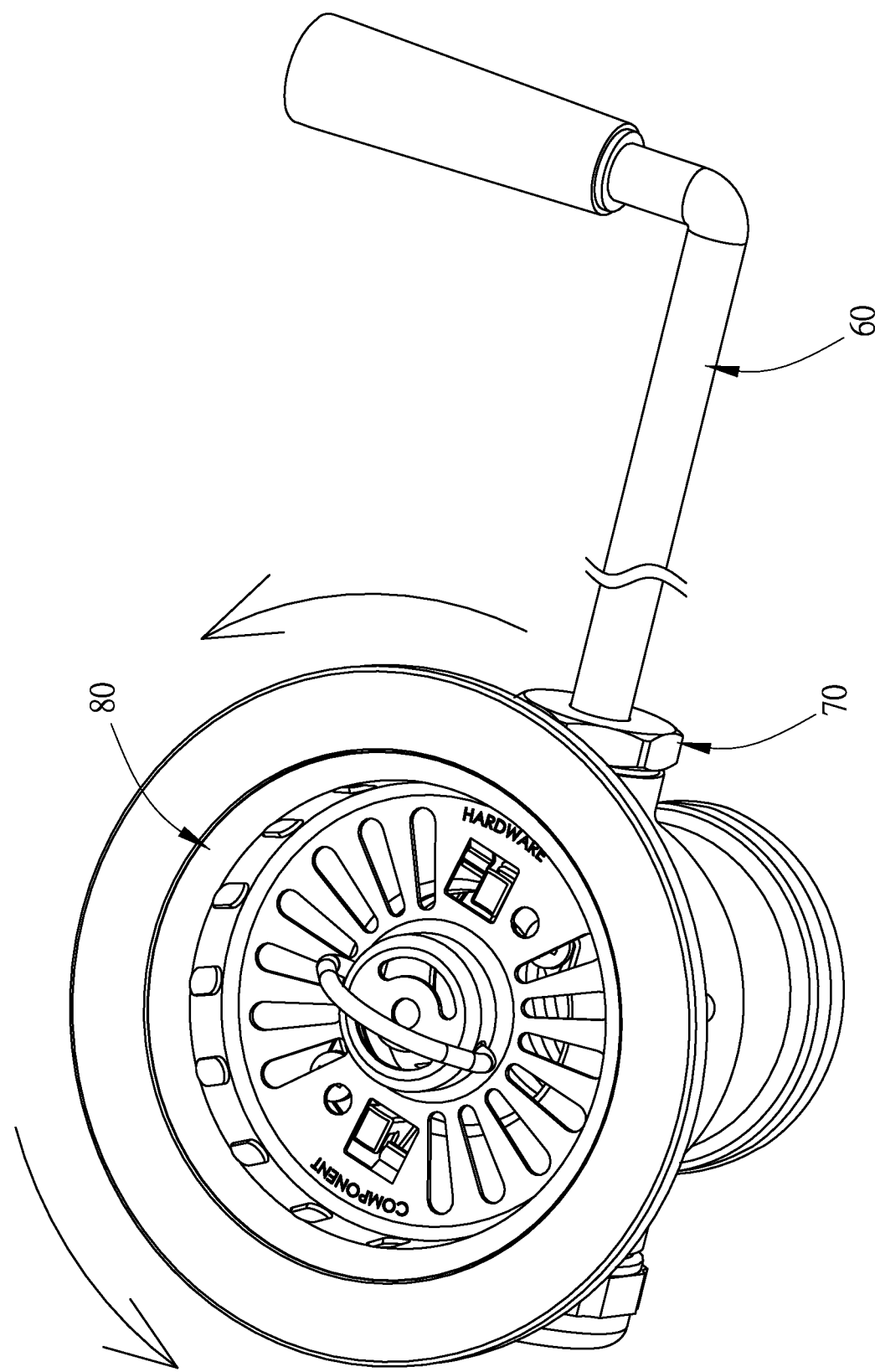
FIG. 13 is another perspective view showing the operation of the filtration holder of the drain valve assembly according to the preferred embodiment of the present invention.
Figure 14:
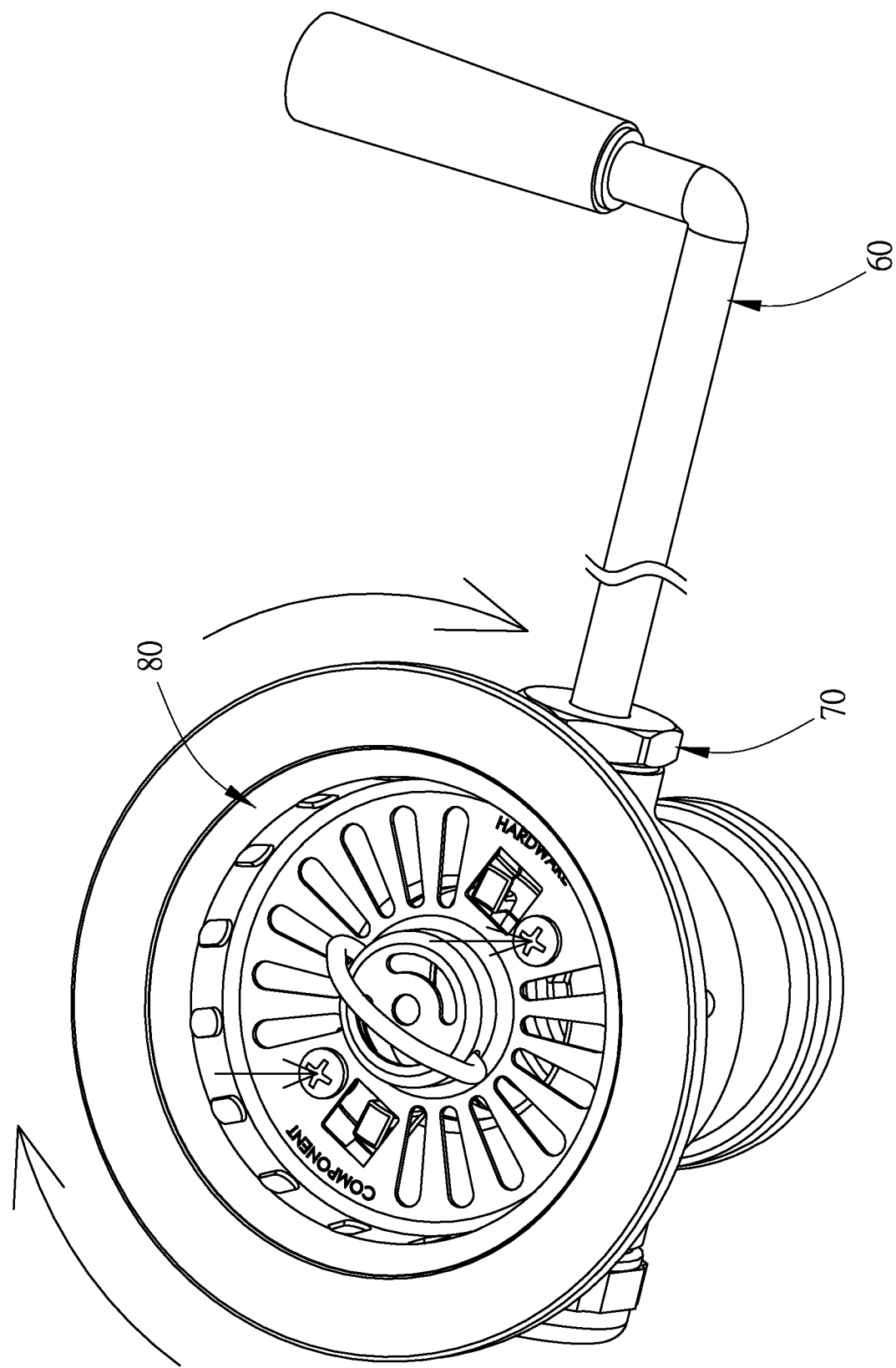
FIG. 14 is also another perspective view showing the operation of the filtration holder of the drain valve assembly according to the preferred embodiment of the present invention.
Figure 15:
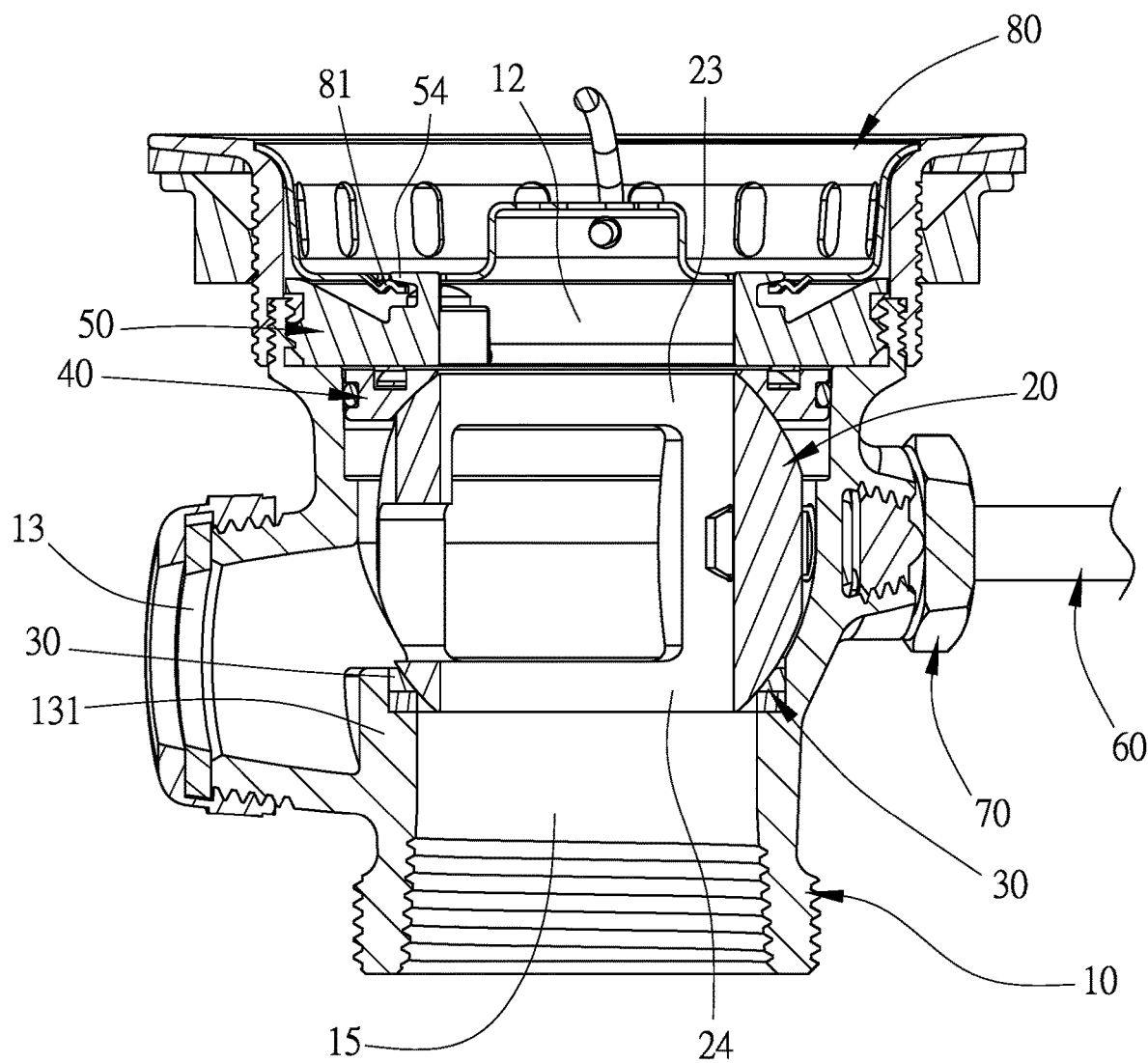
FIG. 15 is a cross sectional view showing the operation of the filtration holder of the drain valve assembly and taken along the line C-C of FIG. 5.

When turning on the drain valve assembly to drain the waters, as shown in FIGS. 6, 10 and 11, the operation portion 62 is operated to control the shaftless ball valve 20 to rotate. Since the shaftless ball valve 20 is completely covered by the first reinforcement ring 30 and the second reinforcement ring 40, the shaftless ball valve 20 merely rotates between the first position X1 and the second position X2 of the rotatable stop portion 111 of the chamber 11, such that the limiting post 28 is rotated to the second position X2 so that the first draining orifice 23 aligns with the first receiving orifice 12, the second draining orifice 24 aligns with the second receiving orifice 15, and the discharge orifice 13 aligns with the opening 22, thus draining the waters.

Figure 7:
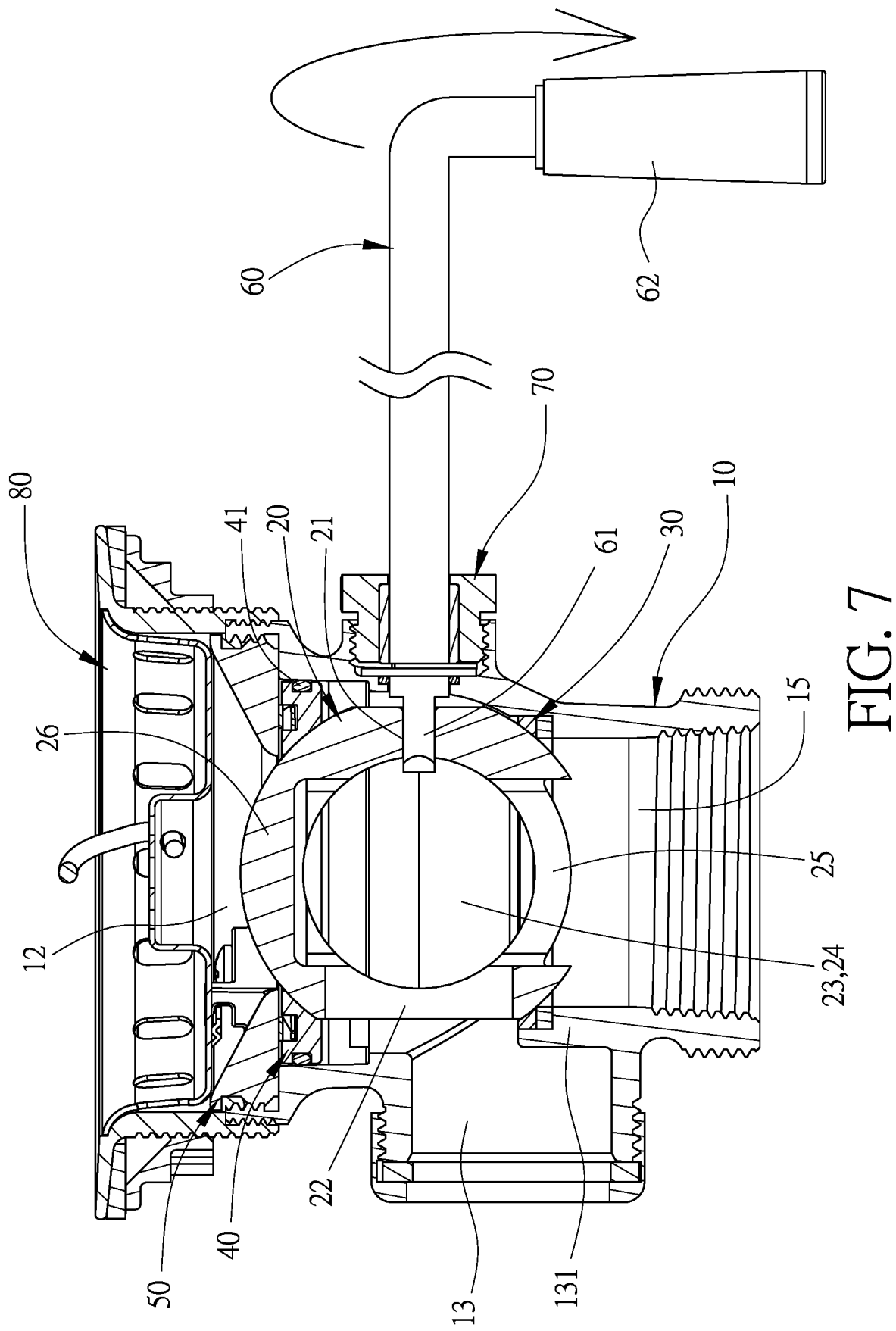
FIG. 7 is a cross sectional view showing the operation of the drain valve assembly according to the preferred embodiment of the present invention.
Figure 8:
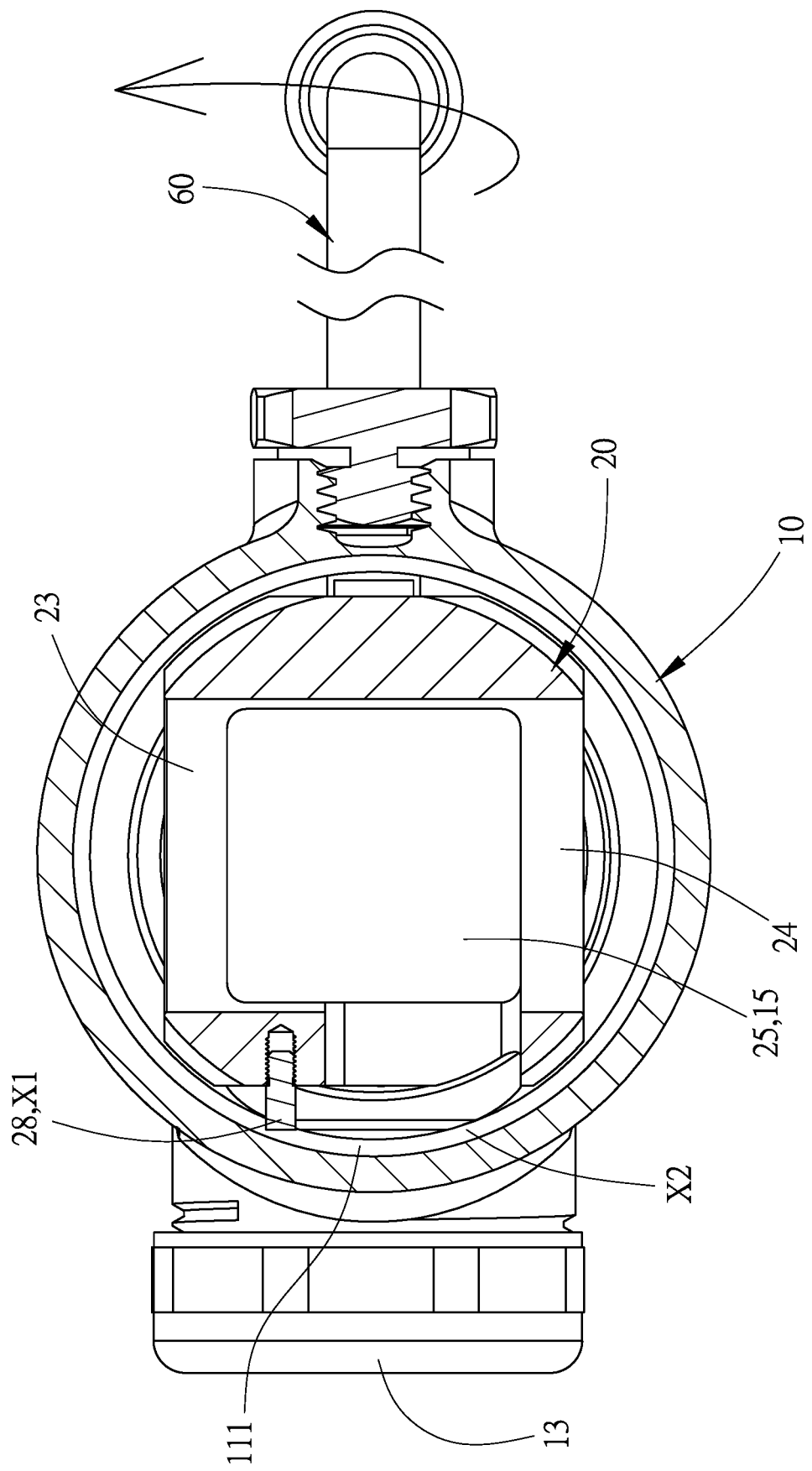
FIG. 8 is another cross sectional view showing the operation of the drain valve assembly according to the preferred embodiment of the present invention.
Figure 9:
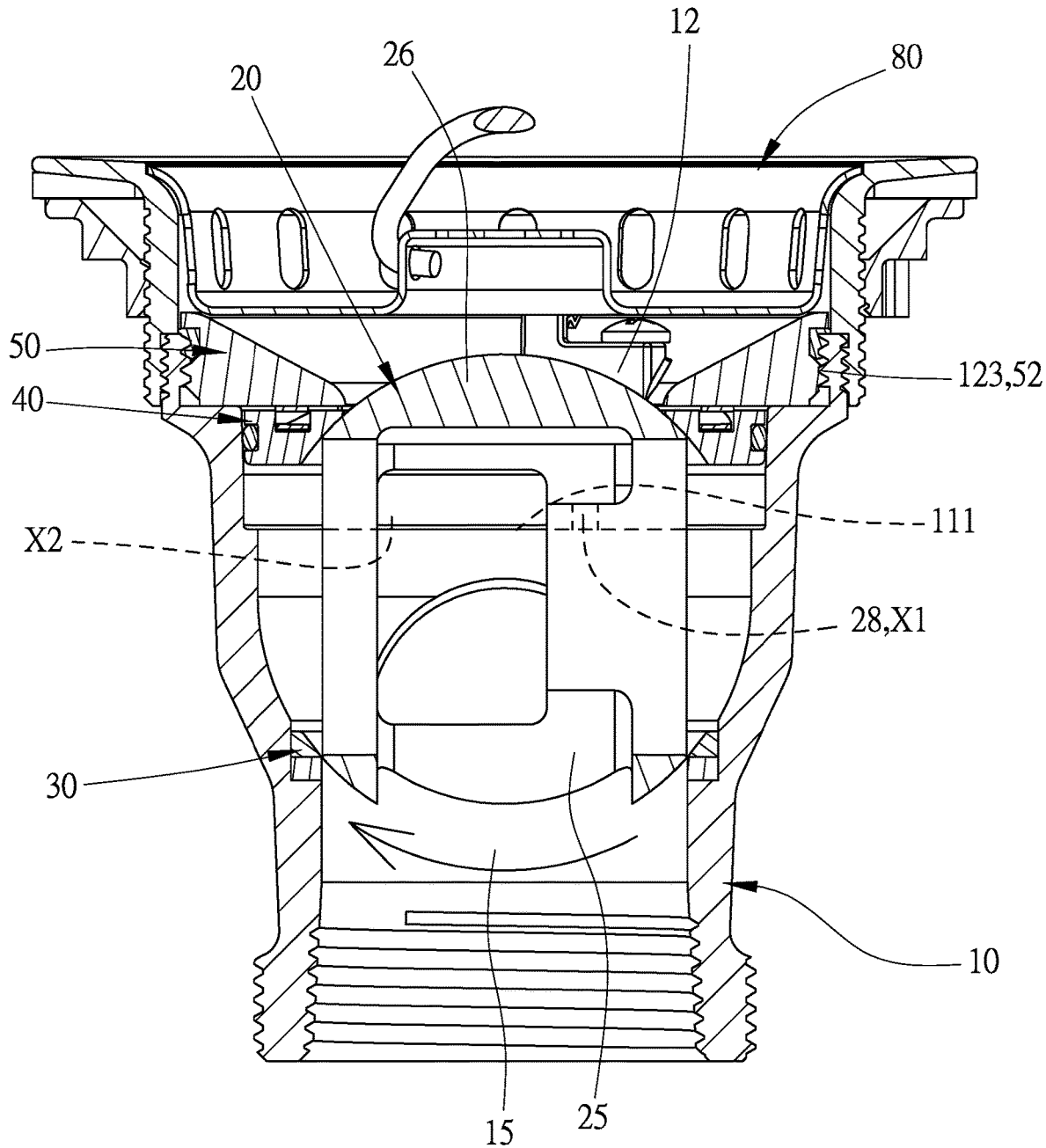
FIG. 9 is also another cross sectional view showing the operation of the drain valve assembly according to the preferred embodiment of the present invention.

Referring to FIGS. 7-9, when turning off the drain valve assembly to stop the waters, the operation portion 62 is operated to control the shaftless ball valve 20 to rotate. Due to the shaftless ball valve 20 is completely covered by the first reinforcement ring 30 and the second reinforcement ring 40, the shaftless ball valve 20 merely rotates between the first position X1 and the second position X2 of the rotatable stop portion 111 of the chamber 11, such that the limiting post 28 is rotated to the second position X1 so that the stopping face 26 aligns with the first receiving orifice 12, the second draining orifice 24 aligns with the second receiving orifice 15, and the discharge orifice 13 aligns with the opening 22, thus stopping the waters.

Accordingly, the drain valve assembly has the following advantages:

The shaftless ball valve 20 includes multiple orifices, such as the opening 22, the first draining orifice 23, the second draining orifice 24, and the third draining orifice 25 to discharge and overflow the waters. In the meantime, the chamber 11 corresponds to the first receiving orifice 12, the discharge orifice 13, the coupling orifice 14, and the second receiving orifice 15 so that when the shaftless ball valve 20 is received in the chamber 11, an axial line passes through the chamber 11 and the shaftless ball valve 20. The discharge orifice 13 has the lower support portion 131 extending to the chamber 11 from the lower end thereof so that the first reinforcement ring 30 and the second reinforcement ring 40 are mounted on the shaftless ball valve 20 in the chamber 11, thus machining and connecting the body 10 easily. Also, the shaftless ball valve 20 includes the defining orifice 27 which matches with the limiting post 28, thus machining the shaftless ball valve 20 quickly to reduce a defective rate greatly.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A drain valve assembly comprising:
 a body including a chamber formed in the body and having at least one rotatable stop portion, a first receiving orifice defined on a top of the body and communicating with the chamber, wherein a diameter of the first receiving orifice is equal to or greater than a diameter of the chamber, a discharge orifice formed on a side of the body, a coupling orifice defined on the other side of the body and communicating with the chamber, and a second receiving orifice formed on a bottom of the body and communicating with the chamber;
 the first receiving orifice having a first shoulder formed on an outer wall of the first receiving orifice, and a second shoulder and a first threaded section which are formed on an inner wall of the first receiving orifice;
 the discharge orifice has a lower support portion extending to the chamber from a lower end thereof so that a profile of the discharge orifice is downward changed from a circle shape to a non-circle shape to connect with the chamber by using an upper end of the discharge orifice, thus supplying water;
 the second receiving orifice including an upper support portion formed on a top thereof and located in the chamber and on the lower support portion;
 a shaftless ball valve received in the chamber and including a fixing orifice, an opening corresponding to the fixing orifice, a first draining orifice, a second draining orifice, a third draining orifice and a stopping face which are formed in turn between the fixing orifice and the opening, wherein the opening, the first draining orifice, the second draining orifice, and the third draining orifice are communicated with one another; the shaftless ball valve further including a defining orifice corresponding to the rotatable stop portion, a limiting post configured to match with the defining orifice, wherein the limiting post has a locating section formed on an end thereof and a defending section formed on the other end of the limiting post, wherein the location locating section is connected with the defining orifice, and the defending section extrudes out of the shaftless ball valve;
 a first reinforcement ring being annular and mounted on the upper support portion and the lower support portion, wherein the first reinforcement ring includes an arcuate face defined on a top thereof and located below the shaftless ball valve;
 a second reinforcement ring being annular and including an arcuate face defined on a bottom of the second reinforcement ring, and the second reinforcement ring being located at an upper portion of the chamber and above the shaftless ball valve;
 a positioning ring including a through orifice defined on a circular center of the positioning ring, a second threaded section formed on an outer wall of the positioning ring and configured to screw with the first threaded section, and an abutting portion fixed on a bottom of a limiter, and wherein the positioning ring includes at least one first engagement foot and at least one shrink portion;
 a controller including a connection portion formed on an end of the controller, an operation portion formed on the other end of the controller, wherein the connection portion is connected with the fixing orifice of the shaftless ball valve so that the controller controls the shaftless ball valve to rotate;
 the limiter configured to connect the controller with the coupling orifice;

a filtration holder disposed on the first receiving orifice, wherein the filtration holder includes at least one second engagement foot;

wherein in assembly, the first reinforcement ring is mounted on the upper support portion and the lower support portion, and the shaftless ball valve is received in the chamber and is engaged with the first reinforcement ring, the controller is coupled with the fixing orifice of the shaftless ball valve by using the connection portion and is received in the coupling orifice; the second reinforcement ring is located above the shaftless ball valve, and the second threaded section of the positioning ring is screwed with the first threaded section, wherein the positioning ring forces the second reinforcement ring to abut against the shaftless ball valve so as to fix the shaftless ball valve; in the meantime, the defending section is located on the rotatable stop portion, when the operation portion of the controller is operated, the shaftless ball valve is located between a first position and a second position to rotate, wherein the filtration holder is mounted on the first receiving orifice, the at least one second engagement foot is aligned with the at least one shrink portion to rotate the filtration holder, such that the at least one second engagement foot is engaged with the at least one first engagement foot.

2. The drain valve assembly as claimed in claim 1, wherein the locating section is in a threaded column shape and is screwed with the defining orifice, and the defending section is a square column.

3. The drain valve assembly as claimed in claim 1, wherein the second reinforcement ring includes a first seal loop connected on an outer wall thereof, and the limiter includes a second seal loop configured to stop the waters between the limiter and the controller.

4. The drain valve assembly as claimed in claim 1, wherein the second reinforcement ring includes a groove defined on a top thereof and a spring received in the groove; the controller includes a retainer disposed adjacent to the connection portion, wherein the limiter is configured to connect the retainer of the controller with the coupling orifice.

5. The drain valve assembly as claimed in claim 1, wherein a tilted face extends downward to a circular center of the positioning ring and between the through orifice and the outer wall of the positioning ring, wherein the tilted face has at least one projection, the at least one first engagement foot extending from the projection, at least one locking orifice locked with a screw, and the at least one shrink portion located between the at least one first engagement foot and the locking orifice, wherein the at least one first engagement foot, the at least one locking orifice and the at least one shrink portion are concentric with the through orifice; the filtration holder includes the at least one second engagement foot corresponding to the at least one first engagement foot, and the filtration holder includes at least one passing orifice corresponding to the at least one locking orifice; when the at least one second engagement foot is engaged with the at least one first engagement foot, the locking orifice aligns with the at least one passing orifice, and the screw of the locking orifice is locked with the locking orifice or the screw is locked with the locking orifice via the at least one passing orifice.

6. A drain valve assembly comprising:
a body including a chamber formed in the body and having at least one rotatable stop portion, a first receiving orifice defined on a top of the body and communicating with the chamber, wherein a diameter of the first receiving orifice is equal to or greater than a diameter of the chamber, a discharge orifice formed on a side of the body, a coupling orifice defined on the other side of the body and communicating with the chamber, and a second receiving orifice formed on a bottom of the body and communicating with the chamber;

the first receiving orifice having a first shoulder formed on an outer wall of the first receiving orifice, and a second shoulder and a first threaded section which are formed on an inner wall of the first receiving orifice;

the discharge orifice has a lower support portion extending to the chamber from a lower end thereof so that a profile of the discharge orifice is downward changed from a circle shape to a non-circle shape to connect with the chamber by using an upper end of the discharge orifice, thus supplying water;

the second receiving orifice including an upper support portion formed on a top thereof and located in the chamber and on the lower support portion;

a shaftless ball valve received in the chamber and including a fixing orifice, an opening corresponding to the fixing orifice, a first draining orifice, a second draining orifice, a third draining orifice and a stopping face which are formed in turn between the fixing orifice and the opening, wherein the opening, the first draining orifice, the second draining orifice, and the third draining orifice are communicated with one another; the shaftless ball valve further including a defining orifice corresponding to the rotatable stop portion, a limiting post configured to match with the defining orifice, wherein the limiting post has a locating section formed on an end thereof and a defending section formed on the other end of the limiting post, wherein the locating section is connected with the defining orifice, and the defending section extrudes out of the shaftless ball valve;

a first reinforcement ring being annular and mounted on the upper support portion and below the shaftless ball valve, wherein the first reinforcement ring includes a reinforced loop connected on a bottom thereof, and the first reinforcement ring and the reinforced loop pass through a middle section of the discharge orifice;

a second reinforcement ring being annular and including an arcuate face defined on a bottom of the second reinforcement ring, and the second reinforcement ring being located at an upper portion of the chamber and above the shaftless ball valve;

a positioning ring including a through orifice defined on a circular center of the positioning ring, a second threaded section formed on an outer wall of the positioning ring and configured to screw with the first threaded section, and an abutting portion fixed on a bottom of a limiter, and wherein the positioning ring includes at least one first engagement foot and at least one shrink portion;

a controller includes a connection portion and an operation portion formed on the other end of the controller, wherein the connection portion is connected with the fixing orifice of the shaftless ball valve so that the controller controls the shaftless ball valve to rotate;

the limiter configured to connect the controller with the coupling orifice;

a filtration holder disposed on the first receiving orifice, wherein the filtration holder includes at least one second engagement foot;

wherein in assembly, the first reinforcement ring and the reinforced loop are fixed on the upper support portion, and the shaftless ball valve is received in the chamber and is engaged with the first reinforcement ring, the controller is coupled with the fixing orifice of the shaftless ball valve by using the connection portion and is received in the coupling orifice; the second reinforcement ring is located above the shaftless ball valve, and the second threaded section of the positioning ring is screwed with the first threaded section, wherein the positioning ring forces the second reinforcement ring to abut against the shaftless ball valve so as to fix the shaftless ball valve; in the meantime, the defending section is located on the rotatable stop portion, when the operation portion of the controller is operated, the shaftless ball valve is located between a first position and a second position to rotate, wherein the filtration holder is mounted on the first receiving orifice, the at least one second engagement foot is aligned with the at least one shrink portion to rotate the filtration holder, such that the at least one second engagement foot is engaged with the at least one first engagement foot.

7. The drain valve assembly as claimed in claim 6, wherein the locating section is in a threaded column shape and is screwed with the defining orifice, and the defending section is a square column.

8. The drain valve assembly as claimed in claim 6, wherein a tilted face extends downward to a circular center of the positioning ring and between the through orifice and the outer wall of the positioning ring, wherein the tilted face has at least one projection, the at least one first engagement foot extending from the projection, at least one locking orifice locked with a screw, and the at least one shrink portion located between the at least one first engagement foot and the locking orifice, wherein the at least one first engagement foot, the at least one locking orifice and the at least one shrink portion are concentric with the through orifice; the filtration holder includes the at least one second engagement foot corresponding to the at least one first engagement foot, and the filtration holder includes at least one passing orifice corresponding to the at least one locking orifice; when the at least one second engagement foot is engaged with the at least one first engagement foot, the locking orifice aligns with the at least one passing orifice, and the screw of the locking orifice is locked with the locking orifice or the screw is locked with the locking orifice via the at least one passing orifice.

\* \* \* \* \*